Oct. 8, 1968   C. HIGGINS ETAL   3,404,860
HINGED OSCILLATING SWING SUPPORT FOR A MIRROR
Filed Nov. 28, 1966   2 Sheets-Sheet 1
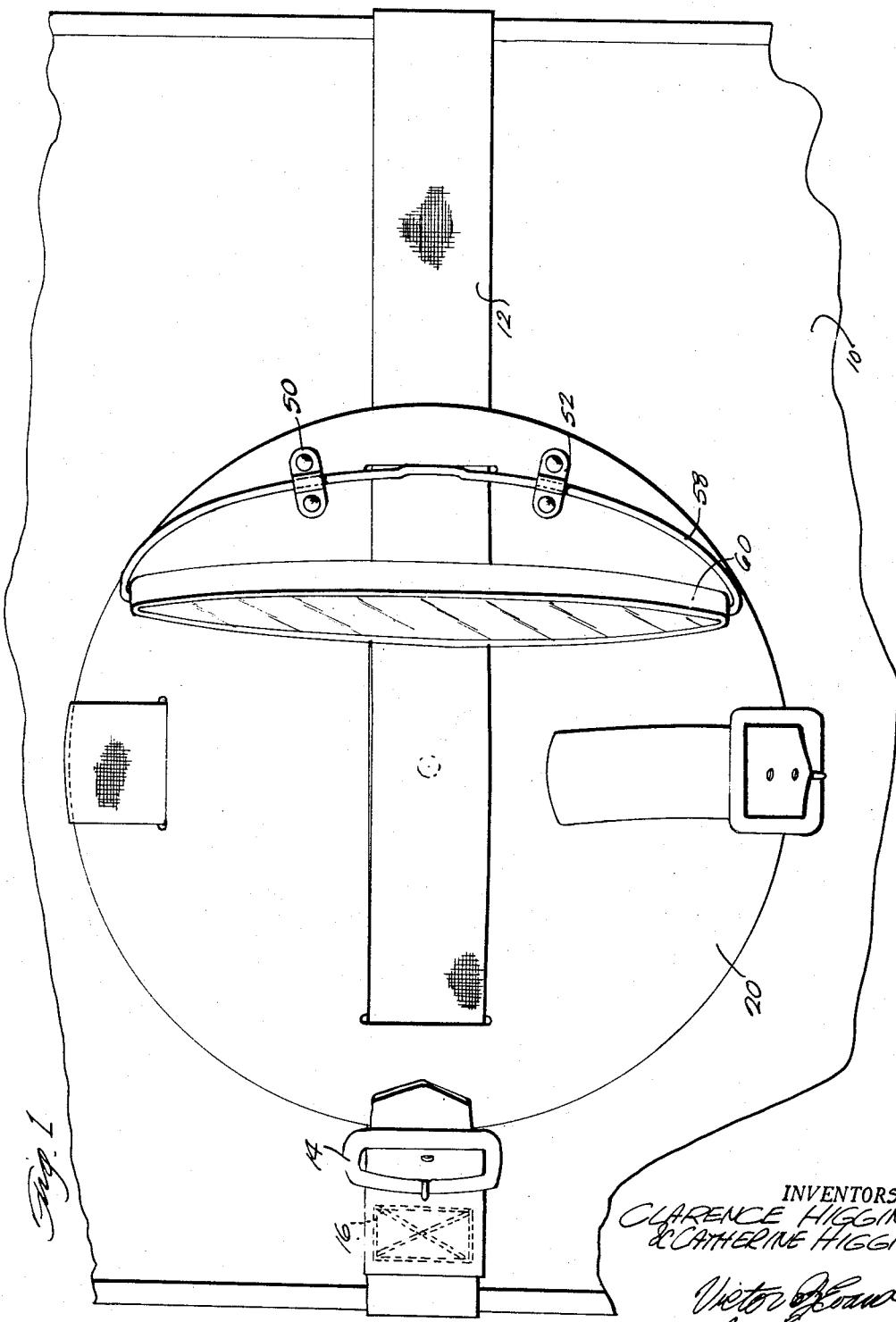
INVENTORS
CLARENCE HIGGINS
& CATHERINE HIGGINS
ATTORNEYS

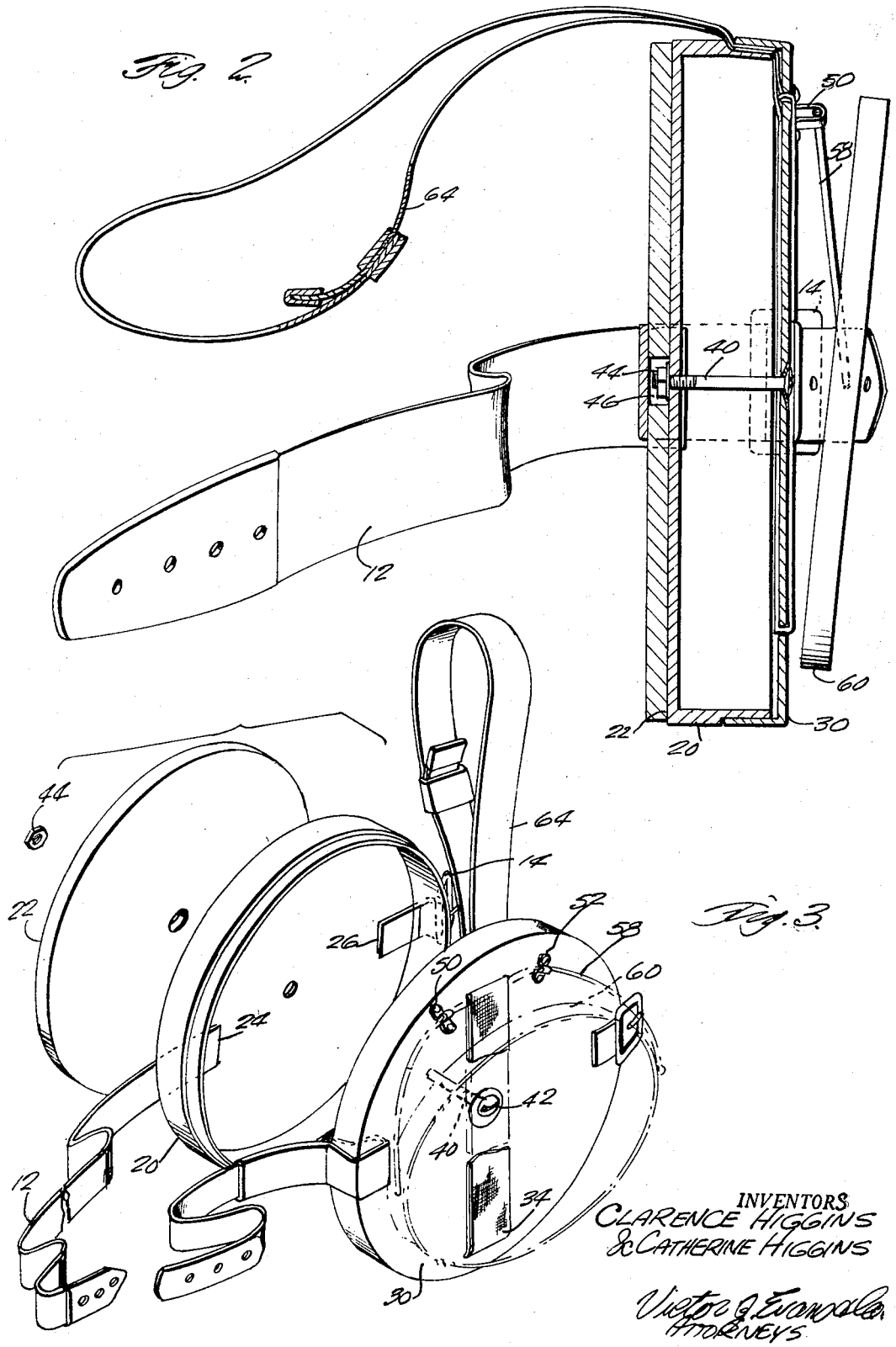

United States Patent Office 3,404,860
Patented Oct. 8, 1968

3,404,860
HINGED OSCILLATING SWING SUPPORT FOR A MIRROR
Clarence Higgins and Catherine Higgins, both of P.O. Box 215, Grand Central Station, New York, N.Y. 10017
Filed Nov. 28, 1966, Ser. No. 597,399
7 Claims. (Cl. 248—479)

The present invention relates to a positioning device secured by an adjustable strap to support a reversible magnifying mirror upon either a hinged or a sliding door medicine cabinet mirror, and more particularly the invention relates to the details and apparatus for providing the adjustable strap loop to be supported on and about the medicine cabinet mirror to which the reversible magnifying mirror is thereby supported.

It is within the purview of the present invention to provide a portably mounted reversible magnifying mirror supported from a medicine cabinet plain mirror sliding door for enabling the user to see with magnification and for use in shaving and the like, and in which the mirror adapted to be mounted by such portable means is adapted to be raised and lowered with facility by the friction and sliding engagement provided by straps to the sliding mirror.

It is a further object of the present invention to provide a portable mounting for a reversible magnifying mirror so that it can be swung oscillatingly to the plain mirror side as desired, and compactly composited within the expanse of the plain mirror door for converting the plain mirror door into a magnifying mirror as desired.

A further object of the present invention is to provide a portable medicine cabinet magnifying mirror which may be easily attached to a hinged or sliding door medicine cabinet to supplement the visual capabilities required by the user and provide added uses for mirrors in hotels, motels, apartments and the like.

A further object of the present invention is to provide a hinged oscillating swing supporting means for a reversible magnifying mirror compactly attached to a cushioned back compartment of a medicine cabinet door securely attached to the door to prevent the mirror detachment so that the magnifying mirror can be swung to the plain mirror side when desired, and to provide a protective frame around the reversible mirror compartment which contains the encircling edge of a regular plain glass mirror on the remaining part of the aforementioned medicine cabinet door.

A further object of the present invention is to provide a mirror that is portable and provides reversible magnifying characteristics that is mountable upon a medicine cabinet door to provide added facility to people experiencing difficulty seeing enough in a plain medicine cabinet mirror construction.

The above and other objects and advantages of the invention will become apparent upon full consideration of the following detailed description and accompanying drawings:

FIGURE 1 is a front elevational view shown partly broken away in which there is shown the manner in which the hinged oscillating swing support for the mirror is mounted on a sliding door in accordance with a preferred embodiment of the present invention;

FIGURE 2 shows a cross-sectional view of a modification in which the hinged oscillating swing support for a conventional medicine cabinet door is arranged in accordance with a modification of the present invention; and FIGURE 3 shows an exploded view of the components illustrated in FIGURE 2 thereof.

Referring now to the drawings, there is shown a sliding door 10 for a medicine cabinet (not shown) of otherwise conventional construction, and in which there is secured about the sliding door 10 a belted strap 12 secured by a buckle 14.

There is a portion of a strap 12 which has an elastic portion 16, or the entire strap may be of elastic material throughout. The strap 12 is attached to a revolvable rimmed base 20 with the back 22 of the base being cushioned and disposed to rest against the sliding door 10 about which the strap is applied around and held in place by the buckle 14. The elastic portion 16 of the belt 12 may be disposed or mounted along any part or portion of the belt 12. The base has the belt attached centrally to the rim so that the belt 12 passes through apertures 24, 26 of the base as shown in FIGURE 3, and the rimmed base 20 engages a mating portion 30 which has perpendicularly disposed apertures 34, 36 relative to the apertures 24, 26 when considered with respect to the other axis of the bolt 40. The bolt 40 holds the rimmed base 20 with the rimmed mating base 30 by a head 42 of the bolt engaging the base 30 and retained in place by a nut 44 disposed at the other end and recessed within a cavity 46 in the cushion 22.

There is mounted on the front cushioned surface 30 by bracket means 50, 52 a wire support 58 for a flat-concave mirror 60, so that one side of the mirror has the concave surface while the other is a flat mirror surface. The necessary amount of the adjustment may be made in the mirror 60 before and even after the mirror is mounted on the sliding door. For a hinged door attachment as may be contemplated in the FIGURES 2 and 3, the strap is formed into a loop adjusted to the door height so that the strap 64 is fitted about the door and then is buckled tightly after being stretched securely around the center portion of the door (not shown). Height adjustments may be made by moving the strap loop 64 up or down as desired.

For a sliding door attachment, and because of the longer length of the strap for vertical purposes, shortening of the strap is accomplished for horizontal insertion between the sliding door mirrors by bringing the strap across a front cushioned base behind a magnifying mirror and slipping the end of the strap through the non-prong part of the buckle holder and then drawing the shortened strap foldingly back across a cushioned surface along the magnifying mirror and inserting the strap in around the back of the sliding door and buckling the magnifying mirror device upon a sliding medicine cabinet door 10. The protrusion of the rimmed cushioned twin base of the medicine cabinet mirror door brings out the giant size magnifying effect of the mirror in close view and is seen to contribute greatly in the optical power for users in shaving or providing its visual objectives, whether in applying makeup or other purposes of personal hygiene.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:
1. A hinged oscillating swing support for a mirror comprising a circular rimmed base having a back with a cushion adapted to be positioned against a hinged or sliding door of a medicine cabinet, a mating base for engaging the rimmed base, a strap looped about the door and being adjustable and elastic for retaining the rimmed base securely to said door, said strap passing through peripheral apertures disposed in said rimmed base, a strap looped about the other dimension of said door and passing through intermediately disposed pairs of apertures in said mating base, a bolt having a head and an engaging nut for passing through said rimmed base, said mating base, and said cushion for maintaining said components in engagement to each other, a bracket disposed on the surface of said mating base and a wire support for a concave-flat mirror to be adjustably secured thereto.

2. The invention according to claim 1 wherein said bolt is centrally and coaxially disposed with respect to said rimmed base, said mating base and said cushion.

3. The invention according to claim 2 wherein said first-mentioned belt is constructed of elastic material in at least one portion thereof.

4. The invention according to claim 3 wherein said mating base and said rimmed base are circular.

5. The invention according to claim 4 wherein said mirror is a reversible magnifying mirror mounted by said adjustable strap loop and is portably disposed for supporting said mirror.

6. The invention according to claim 5 wherein said rimmed base is made of cushioned cardboard, plastic or other cushioned material.

7. The invention according to claim 5 wherein said mirror is adaptable to be mounted upon a built-in medicine cabinet mirror door.

References Cited

UNITED STATES PATENTS

| | | | |
|---|---|---|---|
| 2,199,731 | 5/1940 | Pryne | 312—227 X |
| 2,907,507 | 10/1959 | Solak | 211—13 X |
| 3,315,932 | 4/1967 | Chandler | 248—226 |

FOREIGN PATENTS

| | | |
|---|---|---|
| 324,967 | 10/1902 | France. |
| 971,197 | 9/1964 | Great Britain. |

ROY D. FRAZIER, *Primary Examiner.*

FRANK DOMOTOR, *Assistant Examiner.*